(12) United States Patent
Grimm

(10) Patent No.: US 6,759,775 B2
(45) Date of Patent: Jul. 6, 2004

(54) PERMANENT MAGNET ACTUATING MECHANISM

(75) Inventor: Jeremiah L. Grimm, Goodyear, AZ (US)

(73) Assignee: Abacat, Inc., Phoenix, AZ (US)

(*) Notice: Subject to any disclaimer, the term of this patent is extended or adjusted under 35 U.S.C. 154(b) by 0 days.

(21) Appl. No.: 10/074,478

(22) Filed: Feb. 13, 2002

(65) Prior Publication Data

US 2003/0151323 A1 Aug. 14, 2003

(51) Int. Cl.[7] .............................................. H02K 21/12
(52) U.S. Cl. ............................ 310/156.23; 310/156.01; 310/156.22; 310/49 R
(58) Field of Search ......................... 310/49 R, 156.01, 310/152, 156.21, 156.22, 156.23

(56) References Cited

U.S. PATENT DOCUMENTS

| | | | |
|---|---|---|---|
| 999,335 A | 8/1911 | Pennington | |
| 3,665,227 A | 5/1972 | Busch | |
| 3,670,189 A | 6/1972 | Monroe | |
| 3,828,213 A | 8/1974 | Yamashita | |
| 4,315,171 A | * 2/1982 | Schaffer | .................... 310/49 R |
| 4,551,658 A | * 11/1985 | Rhee | ........................... 318/254 |
| 4,947,071 A | 8/1990 | Clarke | |
| 5,334,899 A | * 8/1994 | Skybyk | ....................... 310/268 |
| 5,426,338 A | 6/1995 | Leupold | |
| 5,523,637 A | 6/1996 | Miller | |
| 5,594,289 A | 1/1997 | Minato | |
| 5,907,205 A | 5/1999 | Herman | |
| 5,936,323 A | 8/1999 | Shibukawa et al. | |
| 6,013,962 A | 1/2000 | Nashiki | |
| 6,031,311 A | 2/2000 | Lee | |
| 6,181,041 B1 | * 1/2001 | Nose | ........................... 310/164 |
| 6,262,507 B1 | 7/2001 | Sato | |

* cited by examiner

*Primary Examiner*—Burton S. Mullins
*Assistant Examiner*—Iraj A. Mohandesi
(74) *Attorney, Agent, or Firm*—Olson & Hierl, Ltd.

(57) ABSTRACT

A permanent magnet motor comprises a frame and a plurality of energizable coils mounted on the frame and are substantially equally spaced from one another. A starting coil is mounted on the frame. A wheel is rotatably mounted on the frame. Carried on the wheel are a plurality of permanent magnets, which are substantially equally spaced form one another. The axes of the energizable coils are disposed substantially at right angles to the axes of the permanent magnets. The permanent magnets cooperate with the energizable coils, so that upon energization of the starting coil, the wheel will begin to rotate in a first direction and upon energization of the energizable coils the wheel will continue to rotate in said first direction. The energizable coils are generally cylindrical and the outer surface of each permanent magnet has a recess complementary to the outer surface of the energizable coil so that the permanent magnet and pass closely to the energizable coil during rotation of the wheel. Control circuitry is provided for energizing the energizable coils.

14 Claims, 7 Drawing Sheets

PERMANENT MAGNET ACTUATING MECHANISM

BACKGROUND OF THE INVENTION

The present invention pertains to a permanent magnet actuating mechanism, and more particularly, to a permanent magnet motor that can be driven from a self-contained source of power.

There is a need for a relatively inexpensive, self-contained source of power for remote locations. Permanent magnet motors or generators are known in the art, see, for example, Pennington U.S. Pat. No. 999,335; Busch U.S. Pat. No. 3,665,227 and Clarke U.S. Pat. No. 4,947,071. The Pennington patent shows a magneto generator having a plurality of cores, which are mounted on an annular ring secured to the casing. Carried on a shaft for rotation in the casing are a plurality of C-shaped magnets, the north-south axis of each being aligned with the longitudinal axis of each core. The Busch patent reveals a relatively complex design for an electric motor-generator that includes a shaft, a rotating member with snap-on coils, and magnetic members in a casing. The Clarke patent discloses a relatively complex high speed motor having horseshoe-shaped magnets mounted on a rotor and a plurality of stator electromagnets spaced apart about the rotor cavity of the motor. The stator is formed in two arrays, each of which includes pulling electromagnets and pushing electromagnets. The present invention is intended to simplify the design of a permanent magnet motor, to provide same with a self-contained power source, such as a battery, so that it can be used at remote locations, and to enhance the performance of existing designs in a straightforward manner.

In one aspect of the invention, the permanent magnet actuating device incorporates a stator with energizing coils, a member actuated thereby, a battery power source for energizing the energizing coils for actuating the member. Upon actuation of a control circuit, the member will be actuated. It is contemplated that the member may be moved linearly, though in a presently preferred embodiment of the invention, the member is a rotor in a permanent magnet motor and is rotated for providing a rotary output. The rotor will be provided with a plurality of permanent magnets that cooperate with the energizing coils. In essence, the permanent magnet motor can drive an electrical generator for delivering power as needed at a remote site, for example, a microwave tower. In another aspect, it is contemplated that the permanent magnet motor can be employed to operate the electrical appliances in a home or business.

SUMMARY OF THE INVENTION

The permanent magnet actuating mechanism comprises a frame upon which are mounted a plurality of energizable coils. A member is mounted for movement on the frame. A plurality of permanent magnets are mounted on the member. The axes of the energizable coils are disposed substantially at right angles to the axes of the permanent magnets. Upon energization of the energizable coils, the member is moved with respect to the frame. Such movement may be linear. A control is provided for energizing the energizable coils.

In another aspect of the invention, the permanent magnet actuating mechanism may be in the form of a permanent magnet motor comprising a frame mounting a plurality of energizable coils. A starting coil is mounted on the frame. A wheel is rotatably mounted on the frame. Carried on the wheel are a plurality of permanent magnets. The axes of the energizable coils are disposed substantially at right angles to axes of the permanent magnets. The permanent magnets cooperate with the energizable coils, whereby, upon energization of the starting coil, the wheel will begin to rotate in a first direction and upon energization of the energizable coils, the wheel will continue to rotate in the first direction. Preferably, the permanent magnets are equally spaced from one another on the wheel and the energizable coils are equally spaced from one another on the frame. In one specific embodiment of the invention there are four energizable coils and eight permanent magnets. A control arrangement is provided for selectively energizing the starting coil and the energizing coils. The control arrangement includes a power source, for example, a battery.

An object of the present invention is to provide a relatively inexpensive source of power that can be used at remote locations that is self-contained and comprises a permanent magnet motor actuated from a battery.

Another object of the present invention is to provide a relatively inexpensive self-contained permanent magnet motor actuated from a battery that can be used to power a generating device.

Yet another object of the present invention is to provide a permanent magnet motor incorporating a stator with energizable coils and a rotor with a plurality of permanent magnets secured thereto, the axes of the energizable magnets being disposed at substantially right angles to the axes of the permanent magnets.

A further object of the present invention is to provide a permanent magnet motor having a stator with equidistantly spaced energizable coils and a rotor with a plurality of permanent magnets secured thereto, the outer surfaces of the permanent magnets being constructed and arranged to be complementary to the exterior surfaces of the energizable coils, whereby the outer surface of each permanent magnet passes closely to the outer surface of an energizable coil during rotation of the rotor.

Other objects and advantages of the present invention will be made more apparent hereinafter.

BRIEF DESCRIPTION OF THE DRAWING

There is shown in the attached drawing a presently preferred embodiment of the present invention, wherein like numbers in the various views refer to like element and wherein.

DETAILED DESCRIPTION OF THE INVENTION

Figure 1:
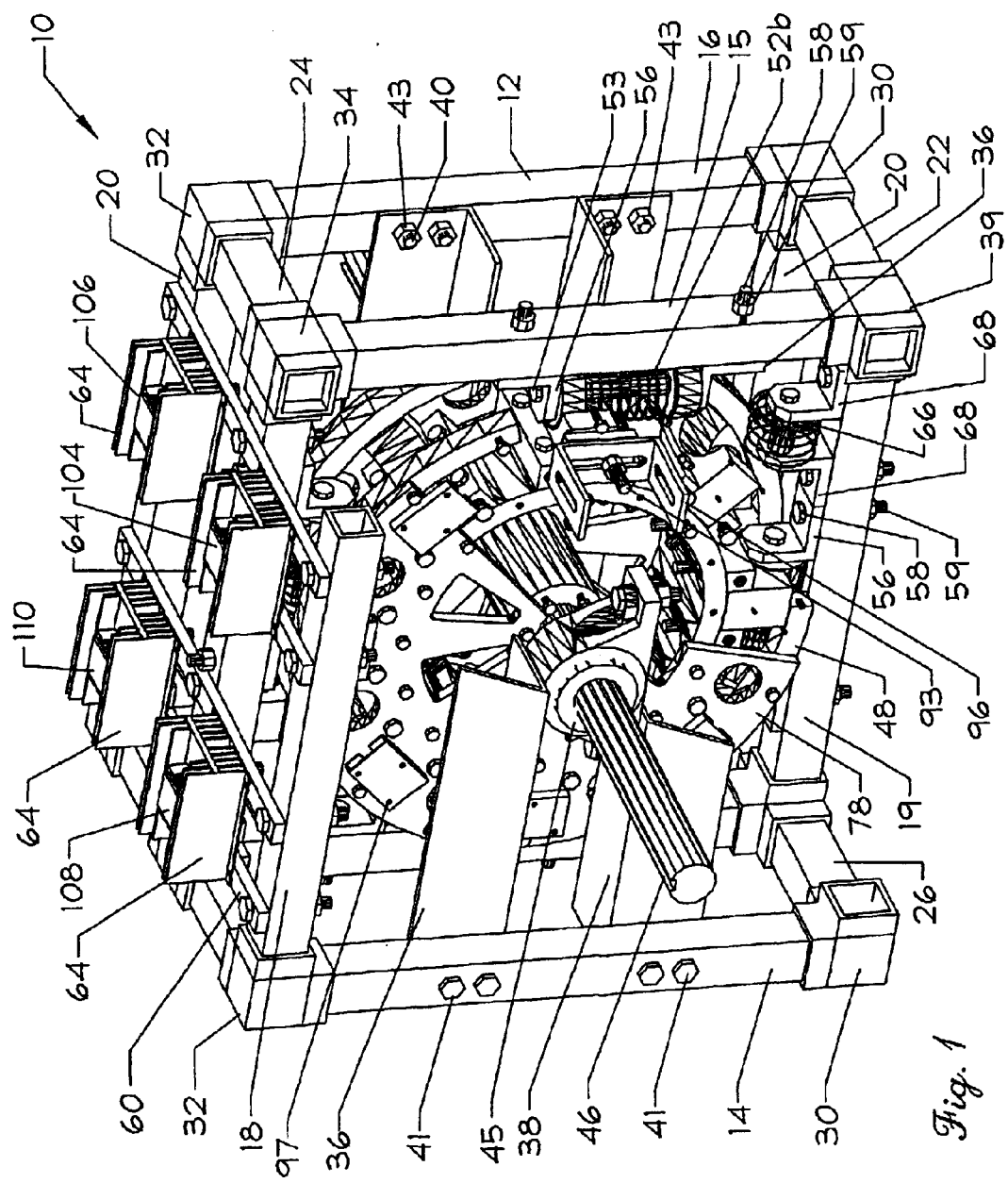
FIG. 1 is a perspective view of a permanent magnet motor embodying the present invention.

There is shown in FIGS. 1–5 a presently preferred embodiment of the present invention. The permanent magnet motor 10 comprises a frame 12 having uprights 14, 15, 16 at each end, which are interconnected by outer struts 18,20, intermediate strut 19, and cross strut 22, 24, 26. The struts may be made from a suitable material, such as aluminum. Corners 30 each connect an upright, an outer strut and a cross strut, for example, the lower right corner 30 in FIG. 1 connects the cross strut 22, the upright 16 and the lower outer strut 20. The openings in the corners for receiving the various frame members are substantially at right angles to one another. Connectors 40 secure the cross struts with the intermediate upright 15 and the intermediate strut 19. The connectors 40 are provided with aligned openings for receiving cross struts and openings at substantially right angles for receiving the intermediate upright 15 and the intermediate strut 19. Upper longitudinal brace 36 and lower longitudinal brace 38 help to rigidify the frame 12. The upper and lower braces 36 and 38, respectively, may be fabricated from stainless steel and are in the form of angles. Suitable fasteners, for example, bolt and nuts 41,43 are provided to secure the upper and lower braces 36 and 38 to the upright 14 and 16.

Figure 2:
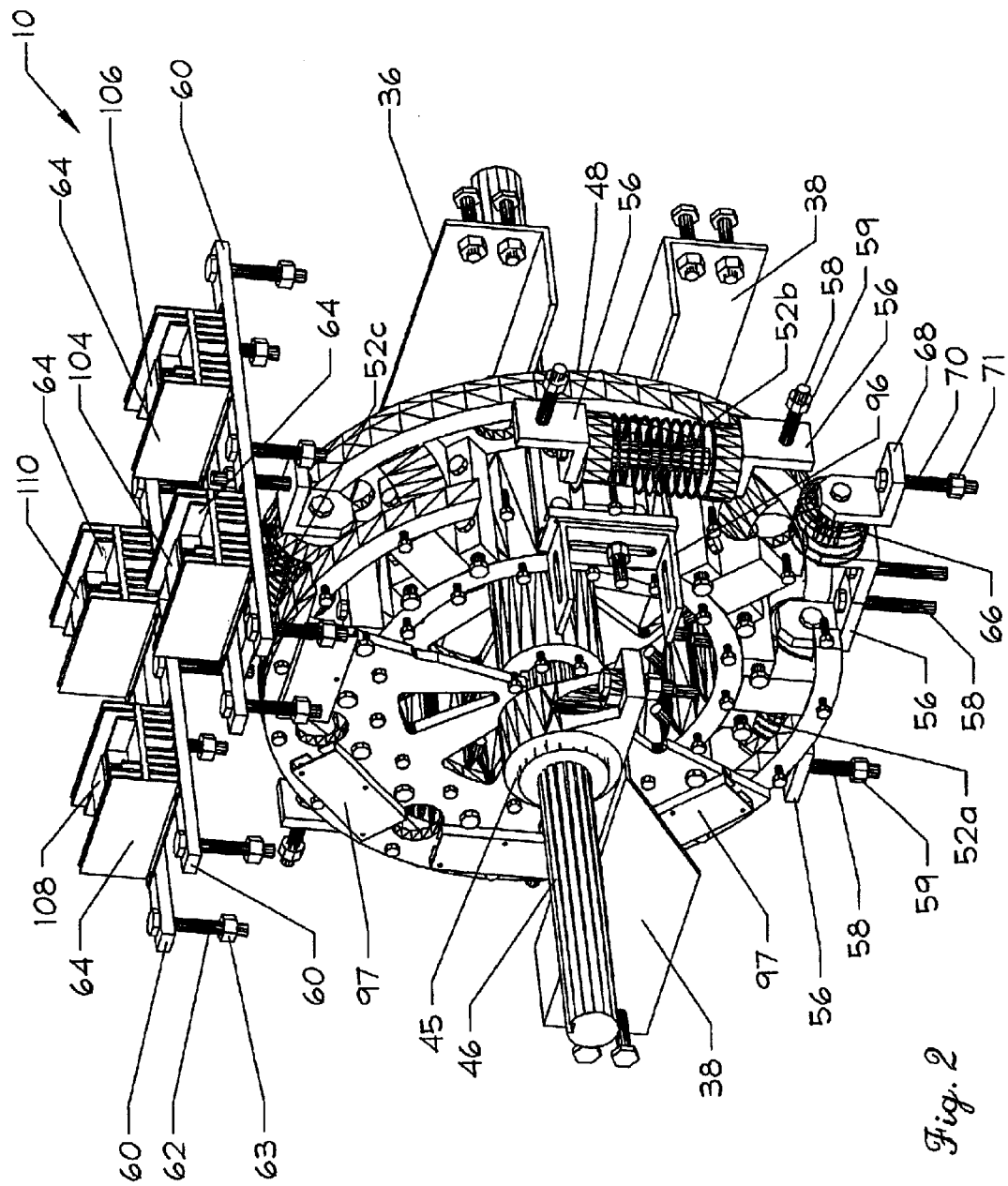
FIG. 2 is a perspective view of the permanent magnet motor of FIG. 1, with parts broken away.
Figure 3:
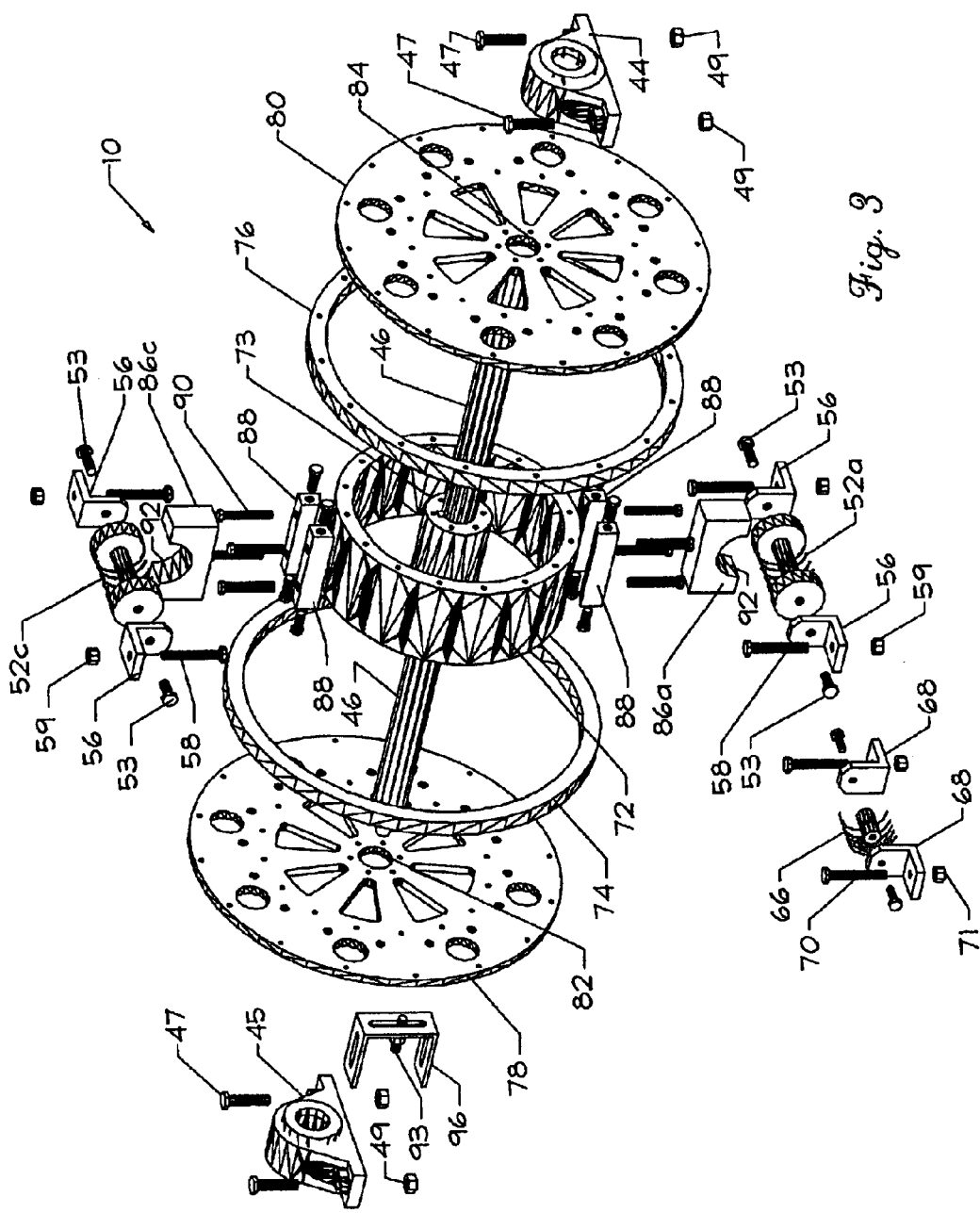
FIG. 3 is an exploded perspective view of the permanent magnet motor of FIG. 1.
Figure 4:
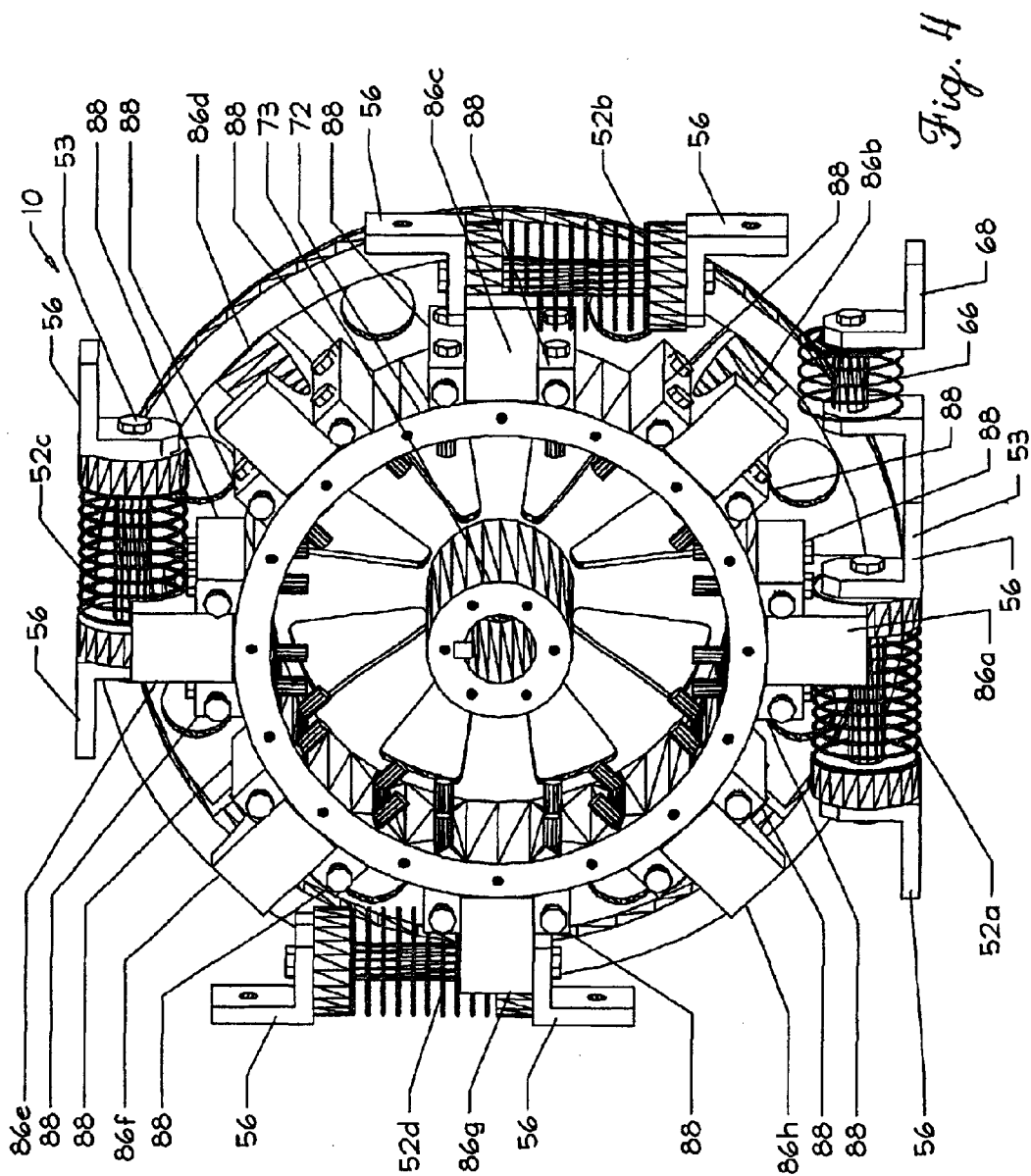
FIG. 4 is a front perspective view of the permanent magnet motor, with parts broken away.
Figure 5:
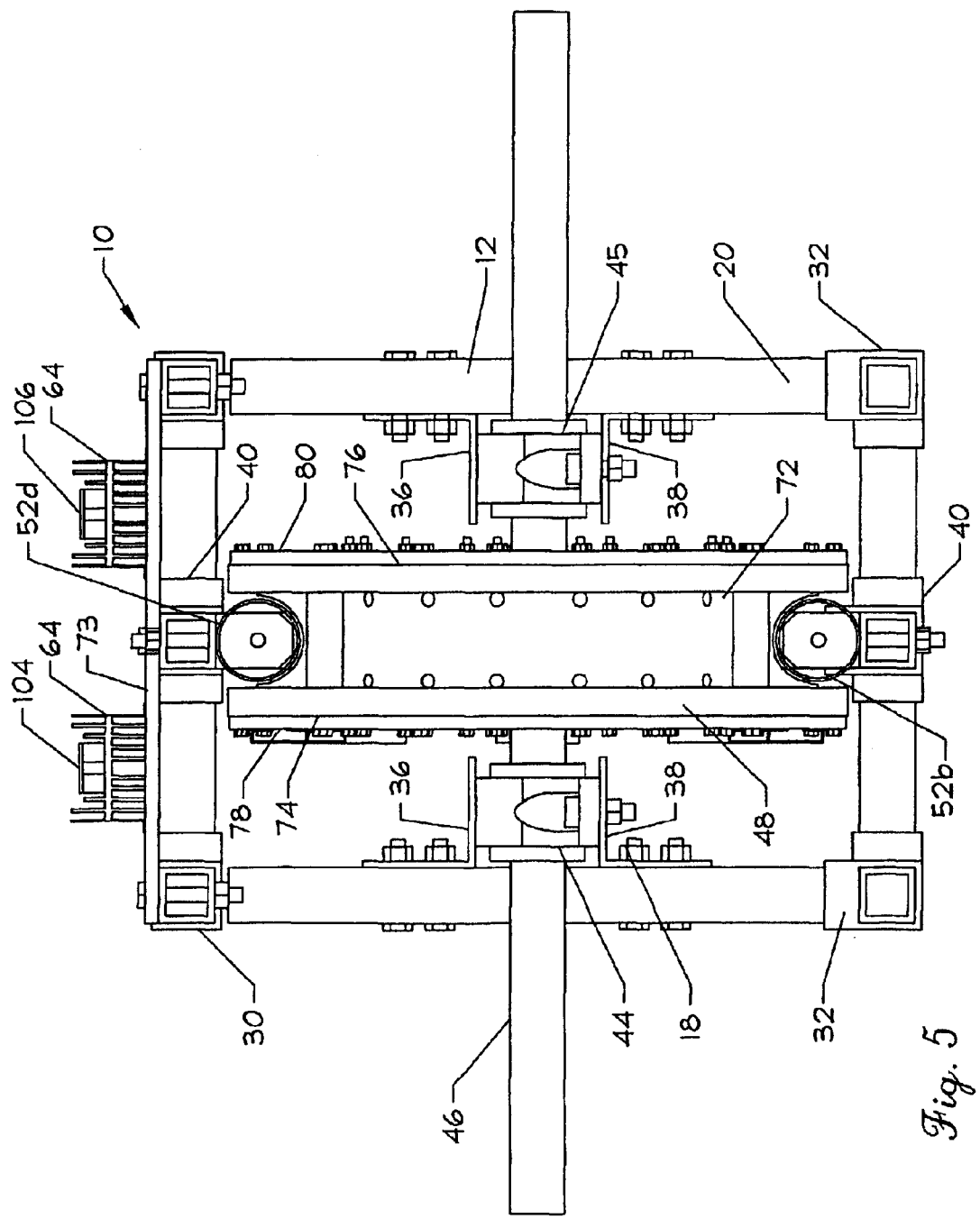
FIG. 5 is a side elevational view of the permanent magnet motor of FIG. 1.

Bearings 44,45 are secured to the upper and lower braces 36 and 38 by suitable fastening means, for example, bolts 47 and nuts 49, for rotatably supporting the shaft or axle 46 of the wheel 48. Equidistantly spaced on the frame 12 are four energizable coils 52a, 52b, 52c, and 52d. The energizable coils each comprise a dumbbell-like core of reduced diameter with, wire wound on the center portion between the enlarged diameter ends. The energizable coils have, in general, the exterior appearance of cylinders. The energizable coils 52a, 52b, 52c, and 52d are connected to the frame 12 by core fastener means, which may be in the form of angle brackets 56 secured on the one side to an end to the core of an energizable coil and the other side of a part of the frame 12. For example, as seen in FIGS. 1 and 2, there is a bracket 56 at each end of the energizable coil 52b. The brackets 56 are secured to the upright 15 by suitable fastening means, for example, bolts and nuts 58,59 and to the core of the energizable coil 52b by screws 53, or like fasteners.

Secured to the top of the frame 12 are supports 60 that are connected to the struts 18, 19, and 20 by suitable fastening means, for example, bolts 62 and nuts 63. Mounted on the supports 60 are heat sinks 64 and solid state relays 102,104, 106,108. As shown in FIGS. 1 and 2, four heat sinks 64 are used in the preferred embodiment of the invention, though it will be understood that different numbers of heat sinks may be used, depending upon the application. The heat sinks 64 are operative to cool the controller in the control means, as will be discussed hereinafter. The operation of the solid state relays will also be discussed hereinafter.

A starting coil 66 is disposed on the frame 12 adjacent the wheel 48. The starting coil 66 may be carried on the lower intermediate strut 19 by angle brackets 68, which may be secured to the strut 19 by suitable fastening means, for example, bolts and nuts 70, 71. As will be more fully explained hereinafter, the starting coil 66 will be energized to start the wheel 48 rotating in a first direction, for example, clockwise.

The wheel 48 comprises a central support or inner stabilizer ring 72, outer stabilizer rings 74 and 76, and wheel covers 78, 80. Inner torque ring 73 is suitably secured to the shaft 46, for example, the inner torque ring 73 may be keyed to the shaft 46. The shaft 46 is drivingly engages within complementary openings 82, 84 in the wheel covers 78, 80. Secured equidistantly about the wheel 48 are a plurality of permanent magnets. In the embodiment illustrated there are eight permanent magnets 86a, 86b, 86c, 86d, 86e, 86f, 86g and 86h. The permanent magnets 86a, 86b, 86c, 86d, 86e, 86f, 86g and 86h are each held between stabilizer blocks 88 that are secured to the central support 72 of the wheel 48 by bolts 90. As more clearly shown in FIG. 3 there are two bolts 90 for securing each stabilizer bar 88 to the central support or inner stabilizer ring 72.

The permanent magnets 86a, 86b, 86c, 86d, 86e, 86f, 86g and 86h each have a recessed outer surface 92 that is complementary in shape and size to the outer configuration of the energizable coils 52a, 52b, 52c, and 52d. In use, the outer surface of each permanent magnet 86a, 86b, 86c, 86d, 86e, 86f, 86g and 86h passes closely to the outer surface of an energizable coil 52a, 52b, 52c and 52d during rotation of the wheel 48 for enhancing the magnetic field strength.

A feature of the present invention is that the axes of the energizable coils 52a, 52b, 52c, and 52d are disposed substantially at right angles to the axes of the permanent magnets 86a, 86b, 86c, 86d, 86e, 86f, 86g and 86h. The permanent magnet 86a, 86b, 86c, 86d, 86e, 86f, 86g and 86h are preferably made from a material such as Neodymium.

A proximity switch 93 is carried on bracket 96 secured to the cross braces 36 and 38 of the frame 12. The proximity switch 93 cooperates with the flags 97 on the wheel cover 78. Preferably, the number of flags is equal to the number of permanent magnets and the flags 97 are positioned on the wheel cover 78 corresponding to the position of the associated permanent magnet. In the instant example, there are eight flags 97 suitably affixed on the wheel cover 78. The proximity switch 93 senses the flags 97 during rotation of the wheel 48 for sending a signal to energize the energizing coils 52a, 52b, 52c, and 52d. The energizable coils 52a, 52b, 52c, and 52d are energized or turned on when the proximity switch 93 senses a flag 97 and is deenergized or turned off when the proximity switch 93 no longer senses a flag 97. The function of the proximity switch 94 will be explained later in connection with the explanation of the control means.

Figure 6:
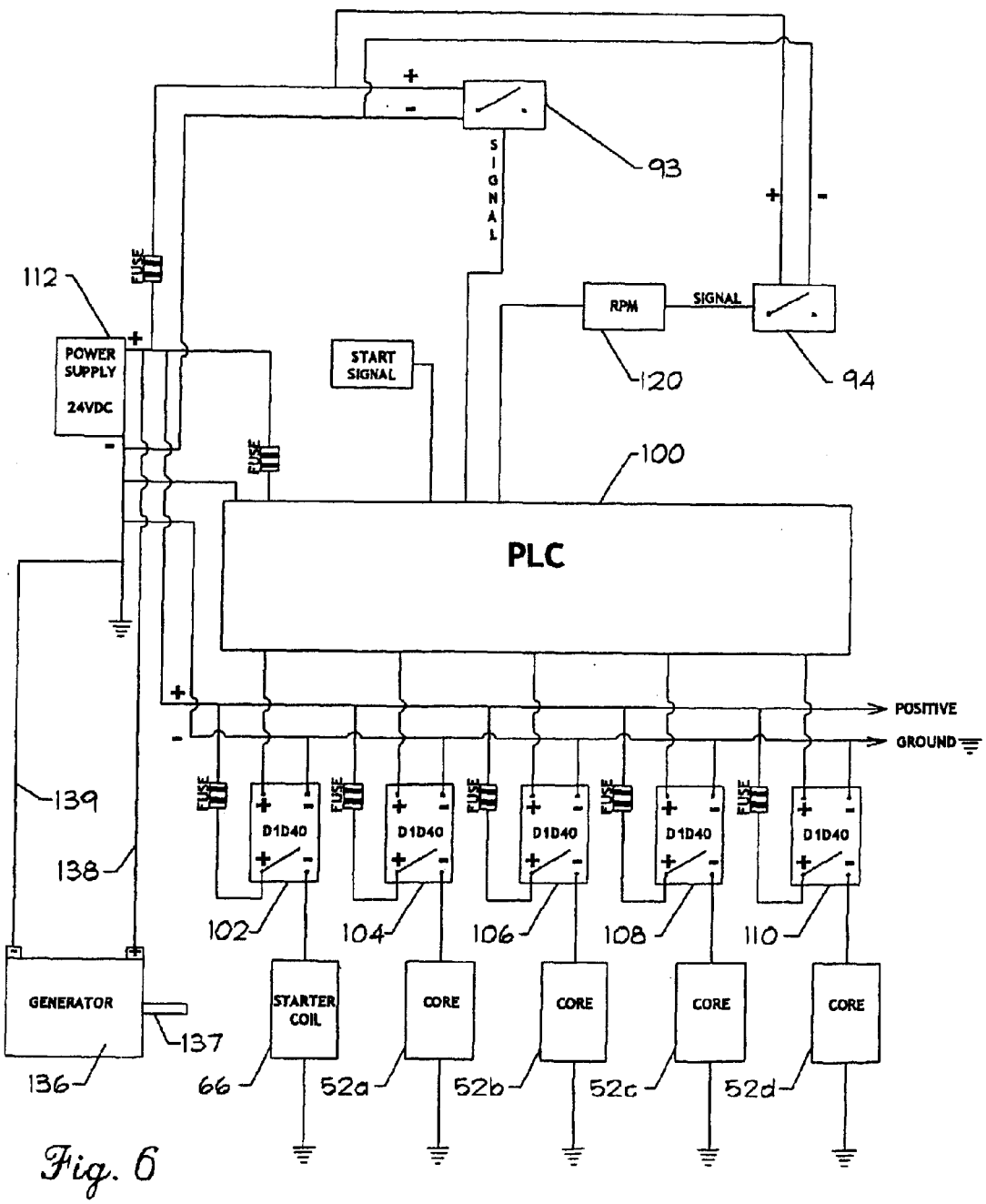
FIG. 6 is a control circuit schematic for the permanent magnet motor.

Control means are provided for selectively and sequentially energizing the starting coil 66 and the energizing coils 52a, 52b, 52c, and 52d. With reference to FIG. 6, the control means includes a controller 100, and solid state relays 102, 104, 106, 108 and 110 in communication therewith. The solid state relay 102 is connected to the starting coil 66. The solid state relays 104, 106, 108 and 110, respectively, are connected to the energizing coils 52a, 52b, 52c, and 52d, respectively. A power supply 112 is operatively connected to the controller 100. Preferably, the power supply 112 comprises a 24 volt DC battery, though it will be apparent to persons skilled in the art that other size batteries or other power sources may be used. An on/off switch 114 is provided to turn the permanent magnet motor 10 on and off. Also in the control means in circuit with the controller 100 are the proximity switches 93 and 94 and RPM gauge 120. Basically, when the switch 114 is turned on, the starting coil 66 is energized to initiate rotation of the wheel 48 in a first direction. Then the energizing coils 52*a*, 52*b*, 52*c*, and 52*d* are energized in order to continue the rotation of the wheel 48. Energization and deenergization of the energizable coils 52*a*, 52*b*, 52*c*, and 52*d* is accomplished by the proximity switch 93 sensing a flag 97 and sending an appropriate signal to the controller 100 to turn the energizable coils on and off. The energizable coils 52*a*, 52*b*, 52*c*, and 52*d* are turned on and off together. The proximity switch 94 senses the RPM of the shaft 46 and displays same on the RPM gauge 120.

The power supply 112 is in circuit with a generator 136 via lines 138 and 139. The generator shaft 137 is suitably connected to the shaft 46 of the permanent magnet motor 10 for driving the generator 136 to provide power for recharging the battery 112. The connection between the shaft 46 of the permanent magnet motor 10 and the shaft 137 of the generator 136 can be a suitable mechanical connection, for example, a belt or chain. Excess capacity of power from the generator 136 can be used to power other devices, as needed, as would be apparent to persons skilled in the art.

Figure 7:
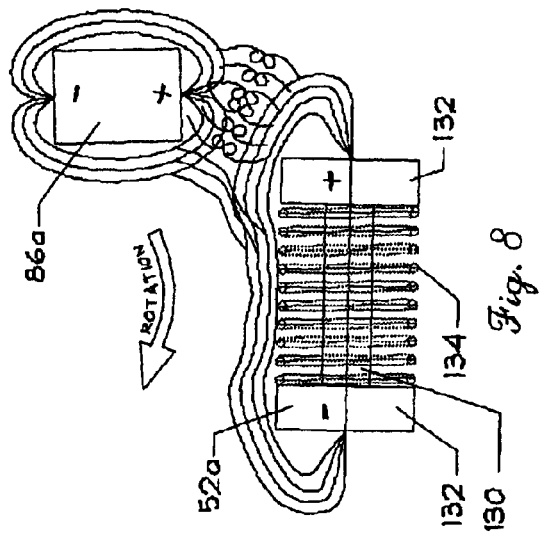
FIG. 7 illustrates schematically the orientation of a permanent magnet on the wheel with a associated energizable coil on the frame in a first position prior to energization of the energizable coil.
Figure 8:
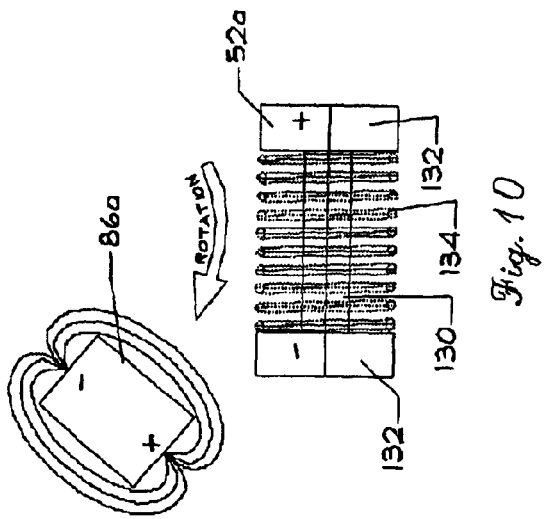
FIG. 8 illustrates schematically the orientation of a permanent magnet with an associated energizable coil, upon energization of the energizable coil.

Turning now to FIGS. 7, 8, 9, and 10 there is shown schematically the operation of a permanent magnet 86*a* with respect to an energizable coil 52*a*. In FIG. 7, the energizable coil 52*a* is deenergized or off. The permanent magnet 86*a* is attracted toward the core of the energizable coil 52*a* as indicated by the attraction force line extending from the positive of the permanent magnet 86*a* toward the positive of the energizable coil 52*a*. In FIG. 8. The energizable coil is shown energized or on. As the permanent magnet 86*a* approaches the energizable coil 52*a* as shown in FIG. 8, there are both attraction and repulsion forces. The repulsion force is indicated by the force lines extending between the positive of the permanent magnet 86*a* and the positive of the energizable coil 52*a*. The attraction force is indicated by the force lines extending from the positive of the permanent magnet to the negative of the energizable coil 52*a*. At the instant represented in FIG. 8, the attraction force and the repulsion force is about equal.

Figure 9:
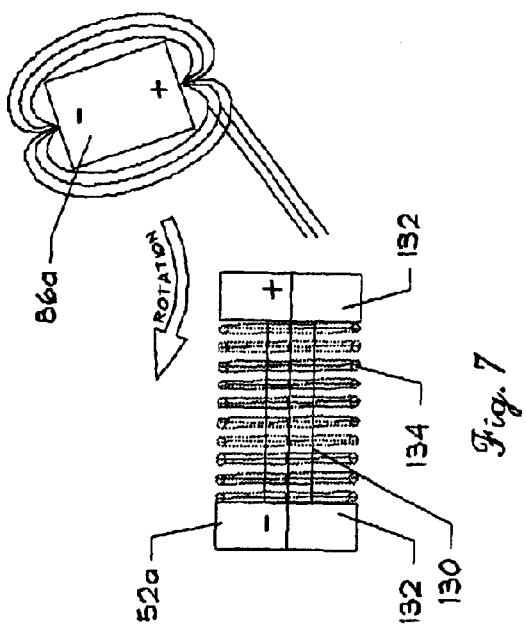
FIG. 9 illustrates schematically the orientation of a permanent magnet with respect to an associated energizable coil during continued rotation from the position shown in FIG. 8.

In FIG. 9 the energizable coil 52*a* is still energized or on. The attraction force is significantly larger than the repulsion force and the permanent magnet 86*a* is urged clockwise as indicated by the rotation arrow in FIG. 9. The axis of the permanent magnet 86*a* is at substantially right angles to the axis of the energizable coil 52*a*. This feature of the invention enhances the magnetic force between the permanent magnet 86*a* and the energizable coil 52*a*. The magnetic force between each of the permanent magnets and an associated energizable coil is further enhanced by the close association of the curved recess 92 defined in the outer surface of each permanent magnet with the complementary exterior surface of each energizable coil. The energizable coil 52*a*, which is representative of each of the energizable coils, includes a core comprising a center portion 130 of reduced diameter and ends 132 of enlarged diameter. Wire 134 is wound on the center portion 130 of the core between the ends 132. In a presently preferred embodiment 10 gage wire is used.

Figure 10:
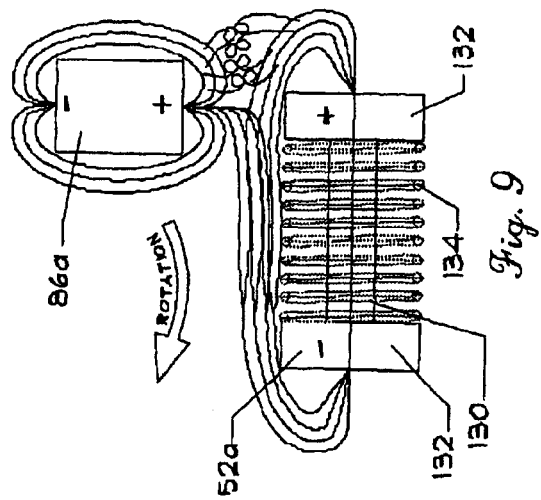
FIG. 10 illustrates schematically the orientation of a permanent magnet with respect to an associated energizable coil upon deenergization of the energizable coil and further rotation of the permanent magnet from the position shown in FIG. 9.

FIG. 10 shows the orientation of the permanent magnet 86*a* after continued rotation following deenergization of the energizing coil 52*a*. It will be understood that the operation described in FIGS. 7–10 will be repeated as each permanent magnet cooperates with a successive energizing coil during rotation of the wheel 48 in the frame 12.

The energizing coils 52*a*, 52*b*, 52*c* and 52*d* will be energized sequentially during operation by the cooperation of the proximity switch 93 on the frame 12 and the flags 97 on the wheel 48. As noted above, the flags 97 are affixed to the wheel cover 78 of the wheel 48 in alignment with an associated permanent magnet. In the embodiment shown in FIGS. 1 and 2, for example, there is a flag associated with each permanent magnet. Thus, there are eight flags 97 and eight permanent magnets 86*a*, 86*b*, 86*c*, 86*d*, 86*e*, 86*f*, 86*g*, and 86*h*. When a flag 97 is sensed by the proximity switch 93, the energizing coils will be energized through the operation of the controller 100 and associated solid state relay. The energizing coils will be energized during the time that a flag 97 is sensed by the proximity switch 93. For example, assume that the proximity switch 93 senses a flag 97 and sends a signal to the controller 100. The controller 100 will actuate the appropriate solid state relays 104, 106, 108, and 110 and the energizable coils 52*a*, 52*b*, 52*c*, and 52*d*, respectively, associated with the solid state relays 104, 106, 108 and 110, respectively.

There has been provided by the present invention an improved permanent magnet motor that incorporates a power source so that it can be employed at remote locations where power might otherwise not be available. The improved permanent magnet motor uniquely includes a stator on the frame and permanent magnets on the rotor or wheel, wherein the axes of the permanent magnets and the energizable coils are at substantially right angles to one another. Further, the outer surface of the permanent magnets are contoured complementary to the exterior surface of the energizable coils so that the permanent magnets and the energizable coils can cooperate closely during rotation of the permanent magnets on the wheel with respect to the energizable coils on the frame.

Other arrangements of permanent magnets and energizable coils are permissible within the scope of the present invention. For example, instead of eight permanent magnets on the wheel or rotor, four permanent magnets are used in a prototype model of the permanent magnet motor. Further, the energizable coils and the support for the permanent magnets could be constructed and arranged linearly, whereby, upon energization of the energizable coils the support would move linearly.

Though I have shown a presently preferred embodiment of the present invention, it will be understood by person skilled in the art that the invention may be otherwise embodied within the scope of the following claims.

I claim:

1. A permanent magnet motor comprising a frame, a plurality of energizable coils mounted on the frame, a wheel rotatably mounted on the frame, a plurality of permanent magnets carried on the wheel, the axes of the energizable coils being disposed substantially at right angles to the axes of the permanent magnets, the permanent magnets cooperating with the energizable coils, whereby, upon energization of the energizable coils the wheel will rotate, the outer surface of each permanent magnet having a recess therein that is complementary to the outer configuration of the energizable coil, whereby the outer surface of the permanent magnet passes closely to the energizable coil during rotation of the wheel.

2. A permanent magnet motor as in claim 1, including a starting coil mounted on the frame, whereby, upon energization of the starting coil, the wheel will begin to rotate in a first direction, and upon energization of the energizable coils, the wheels will continue to rotate in said first direction.

3. A permanent magnet motor as in claim 2, including control means for energizing the energizable coils.

4. A permanent magnet motor as in claim 1, wherein the permanent magnets are equally spaced from one another on the wheel.

5. A permanent magnet motor as in claim 1, wherein the energizable coils are equally spaced from one another on the frame.

6. A permanent magnet motor as in claim 4, wherein there are eight permanent magnets on the wheel.

7. A permanent magnet motor as in claim 5, wherein there are four energizable coils on the frame.

8. A permanent magnet motor as in claim 2, including control means for selectively and sequentially energizing the starting coil and the energizing coil.

9. A permanent magnet motor as in claim 2, wherein there are four energizing coils on the frame and four permanent magnets on the wheel.

10. A permanent magnet motor as in claim 9, wherein the energizing coils are substantially equally spaced from one another and the permanent magnets are substantially equally spaced from one another.

11. A permanent magnet motor as in claim 8, wherein the control means include a battery.

12. A permanent magnet motor comprising a frame, a plurality of energizable coils mounted on the frame, a wheel rotatably mounted on the frame, a plurality of permanent magnets carried on the wheel, the axes of the energizable coils being disposed substantially at right angles to the axes of the permanent magnets, the permanent magnets cooperating with the energizable coils, whereby upon energization of the energizable coils the wheel will rotate, including a starting coil mounted on the frame, whereby, upon energization of the starting coil, the wheel will begin to rotate in a first direction, and upon energization of the energizable coils, the wheel will continue to rotate in said first direction and including control means for selectively and sequentially energizing the starting coil and the energizing coils, the control means including a battery, and wherein the wheel is mounted on a shaft that is journalled on the frame and the control means includes means associated with the shaft for recharging the battery.

13. A permanent magnet motor comprising a frame, a plurality of energizable coils mounted on the frame, a wheel rotatably mounted on the frame, a plurality of permanent magnets carried on the wheel, the axes of the energizable coils being disposed substantially at right angles to the axes of the permanent magnets, the permanent magnets cooperating with the energizable coils, whereby upon energization of the energizable coils the wheel will rotate, including a starting coil mounted on the frame, whereby, upon energization of the starting coil, the wheel will begin to rotate in a first direction, and upon energization of the energizable coils, the wheel will continue to rotate in said first direction and including control means for selectively and sequentially energizing the starting coil and the energizing coils, the control means including a controller, flags on the wheel which are in alignment with the permanent magnets, a proximity switch means for sensing a flag and for sending a signal to the controller for energizing the energizing coils in sequence.

14. A permanent magnet motor comprising a frame, a plurality of energizable coils mounted on the frame, a wheel rotatably mounted on the frame, a plurality of permanent magnets carried on the wheel, the axes of the energizable coils being disposed substantially at right angles to the axes of the permanent magnets, the permanent magnets cooperating with the energizable coils, whereby upon energization of the energizable coils the wheel will rotate, wherein each energizable coil has an exterior generally in the form of a cylinder and each permanent magnet has an outer surface defined by a curved recess that is complementary to the exterior surface of the energizable coil, whereby, the outer surface of the permanent magnets pass closely to the exterior surface of the energizable coil during rotation of the wheel.

* * * * *